United States Patent
Oishi et al.

(10) Patent No.: US 6,890,262 B2
(45) Date of Patent: May 10, 2005

(54) VIDEO GAME APPARATUS, METHOD AND RECORDING MEDIUM STORING PROGRAM FOR CONTROLLING VIEWPOINT MOVEMENT OF SIMULATED CAMERA IN VIDEO GAME

(75) Inventors: Toshimitsu Oishi, Akashi (JP); Toru Okubo, Kobe (JP); Hideyuki Domitsu, Kobe (JP); Tomoya Yamano, Kobe (JP)

(73) Assignee: Konami Corporation, Tokyo (JP)

( * ) Notice: Subject to any disclaimer, the term of this patent is extended or adjusted under 35 U.S.C. 154(b) by 48 days.

(21) Appl. No.: 10/197,514

(22) Filed: Jul. 17, 2002

(65) Prior Publication Data

US 2003/0017872 A1 Jan. 23, 2003

(30) Foreign Application Priority Data

Jul. 19, 2001 (JP) ........................................ 2001-220312

(51) Int. Cl.[7] .............................................. A63F 13/00
(52) U.S. Cl. ................ 463/31; 463/36; 463/7
(58) Field of Search ................ 463/7, 30–33, 463/36

(56) References Cited

U.S. PATENT DOCUMENTS 4,836,670 A * 6/1989 Hutchinson ................ 351/210
5,616,078 A    4/1997 Oh
5,686,942 A    11/1997 Ball
6,009,210 A    12/1999 Kang
6,176,782 B1 * 1/2001 Lyons et al. ................ 463/36

FOREIGN PATENT DOCUMENTS

| JP | 9-138637 | | 5/1994 | |
| JP | 09-138637 | * | 5/1997 | ............ G09B/9/05 |
| JP | 2000-259856 | * | 9/2000 | ............ G06T/17/00 |
| WO | WO 99/35633 | * | 7/1999 | |

* cited by examiner

*Primary Examiner*—Julie Brocketti
(74) *Attorney, Agent, or Firm*—Jordan and Hamburg LLP

(57) ABSTRACT

A 3-dimensional video game apparatus comprises display 40 for displaying an image; image-processing means 16 for creating a 3-dimensional image from the viewpoint of a simulated camera and displaying that image on a display screen; and game controller 14 which conducts the game in response to reactions of the player, responsive to images displayed on display 40. The game apparatus further comprises camera unit 42 which can be arranged in such an orientation that its field of view is the play area in front of the display screen, and which periodically captures images of the play area in the state thus arranged; a position recognizing part which detects the player's head from the captured image, and detects the two-dimensional movement of the detected head position; and viewpoint change processor which moves the viewpoint of said simulated camera in conjunction with the change direction and change amount of the position of the detected marked region.

16 Claims, 15 Drawing Sheets

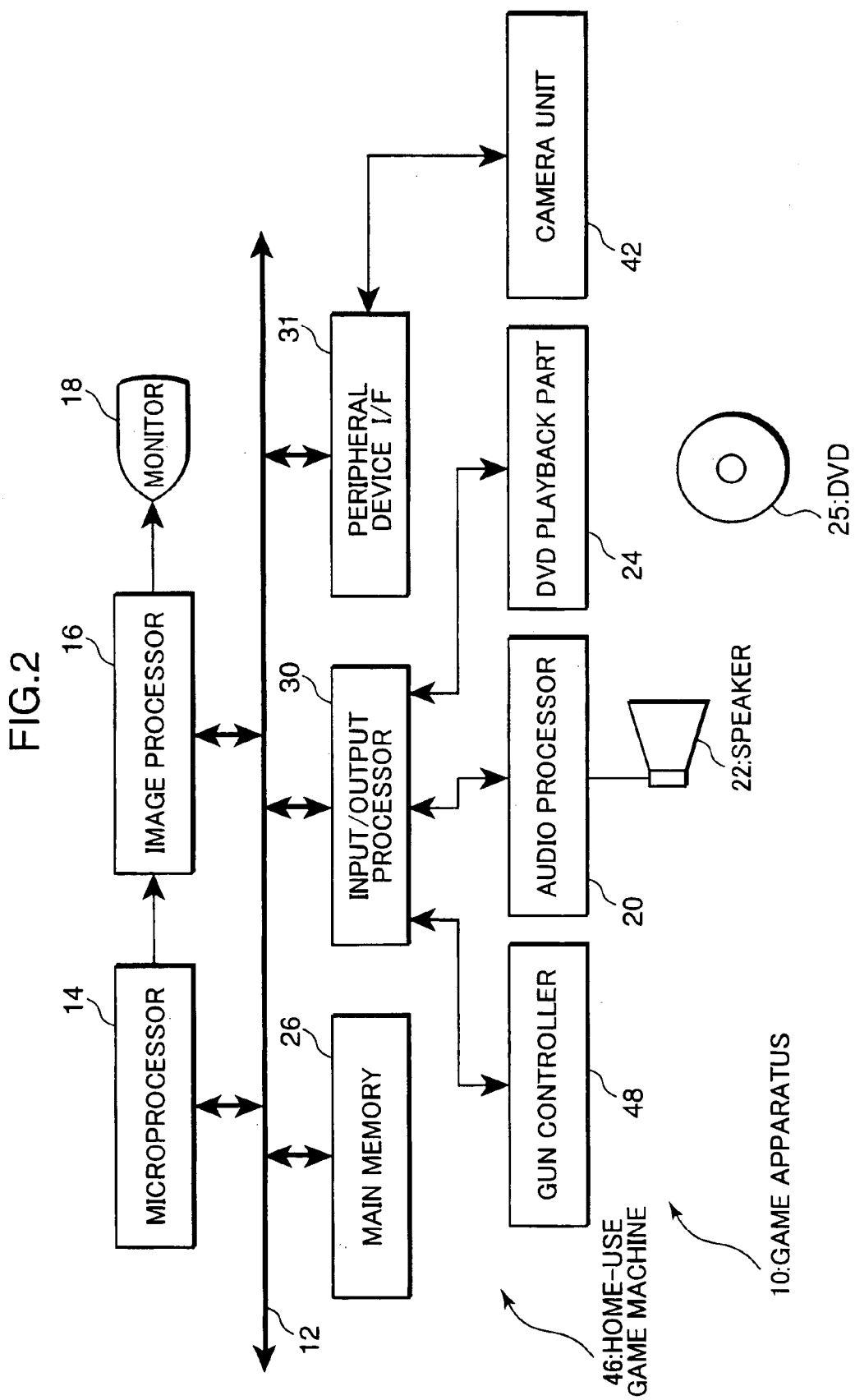

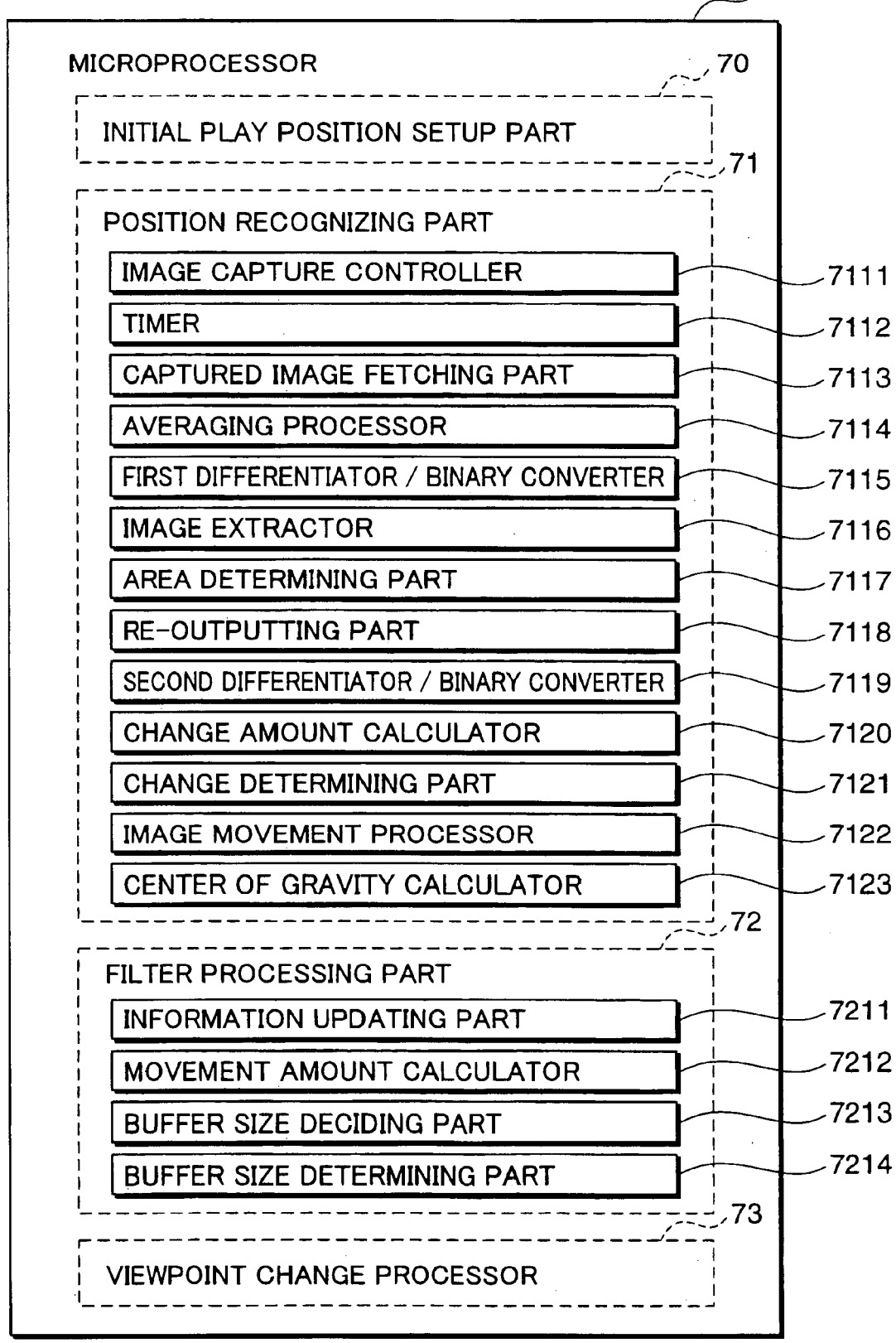

VIDEO GAME APPARATUS, METHOD AND RECORDING MEDIUM STORING PROGRAM FOR CONTROLLING VIEWPOINT MOVEMENT OF SIMULATED CAMERA IN VIDEO GAME

BACKGROUND OF THE INVENTION

1. Field of the Invention

The present invention relates to a video game control technique whereby game images from the viewpoint of a simulated camera, for example a 3-dimensional images, are created and displayed on a display screen and, while varying the viewpoint of a simulated camera, the game is conducted by receiving reactions from a player who is responding to images displayed on the above-mentioned display.

2. Description of the Related Art

Coin-operated game machines, wherein a camera is affixed to an appropriate location on the game cabinet and this camera captures the image of a player, who is playing in front of a game scene displayed on the monitor, are already known. In such game machines, the player's movement is confirmed by image capture of a special detectable object mounted on the player (and suitable for being image-captured by the camera). With these game machines, movement of the human body is detected from the image of the detectable object which is image-captured by the camera, and the game proceeds, developing in response to that movement. In addition, coin-operated games are known in which one ultrasound transmitter and two ultrasound receivers are mounted on top of the player's head, an ultrasound pulse transmitted by the transmitter is reflected by the player's head and the head position is calculated from the propagation times of the ultrasound pulses received by each of the two receivers and the time difference between them. In these games, the viewpoint of a simulated camera, which is the reference for generating simulated 3-dimensional game scenes, is linked to the calculated head position.

In contrast, unlike the case of coin operated games, it is difficult to achieve home video games which provide game scenes having a feeling of realism, through linking the viewpoint of the simulated camera to the player's movement. For example, a fixed and invariable play area cannot be assured, as it can in the case of coin-operated games, so there is the problem of processing the varied background images included in the captured image according to place and time. Furthermore, there is a limit to how strongly a player can be urged to buy the special "detectable object" which, as mentioned above, is easily detectable in a captured image.

SUMMARY OF THE INVENTION

With the foregoing in view, it is an object of the present invention to provide a video game apparatus wherein an image capture means is positioned in the desired position with its orientation such that its field of view is the play area in front of the display screen and wherein the viewpoint of above-mentioned simulated camera is moved, linked to the change direction and change amount of the marked region based on the captured images. It is also an object of the present invention to provide a method and program for controlling movement of the simulated camera viewpoint in a video game.

The one aspect of the present invention relates to a video game apparatus comprising: a display for displaying images; a display control means for creating game images as seen from a simulated camera viewpoint and displaying said images on the screen of the display; and a game control part for conducting the game in response to reactions of a player responsive to the images displayed on the display; an image capture means which can be arranged in such an orientation that its field of view is the play area in front of the display screen, and which periodically captures an image of the play area in the state thus arranged; a position detecting means for detecting from the captured images the position of a player's marked region; a movement detecting means for detecting two-dimensional movement of the position of the marked region thus detected; and a viewpoint changing means for moving the simulated camera viewpoint, in accordance with the change direction and change amount of the position of the detected marked region.

These and other objects, features and advantages of the present invention will become more apparent upon reading the following detailed description along with the accompanied drawings.

BRIEF DESCRIPTION OF THE DRAWINGS

FIG. 2 is a diagram showing the hardware configuration of the game apparatus;

FIG. 3 is a diagram showing the software configuration of the microprocessor of the game apparatus;

DESCRIPTION OF THE PREFERRED EMBODIMENTS

Figure 1:
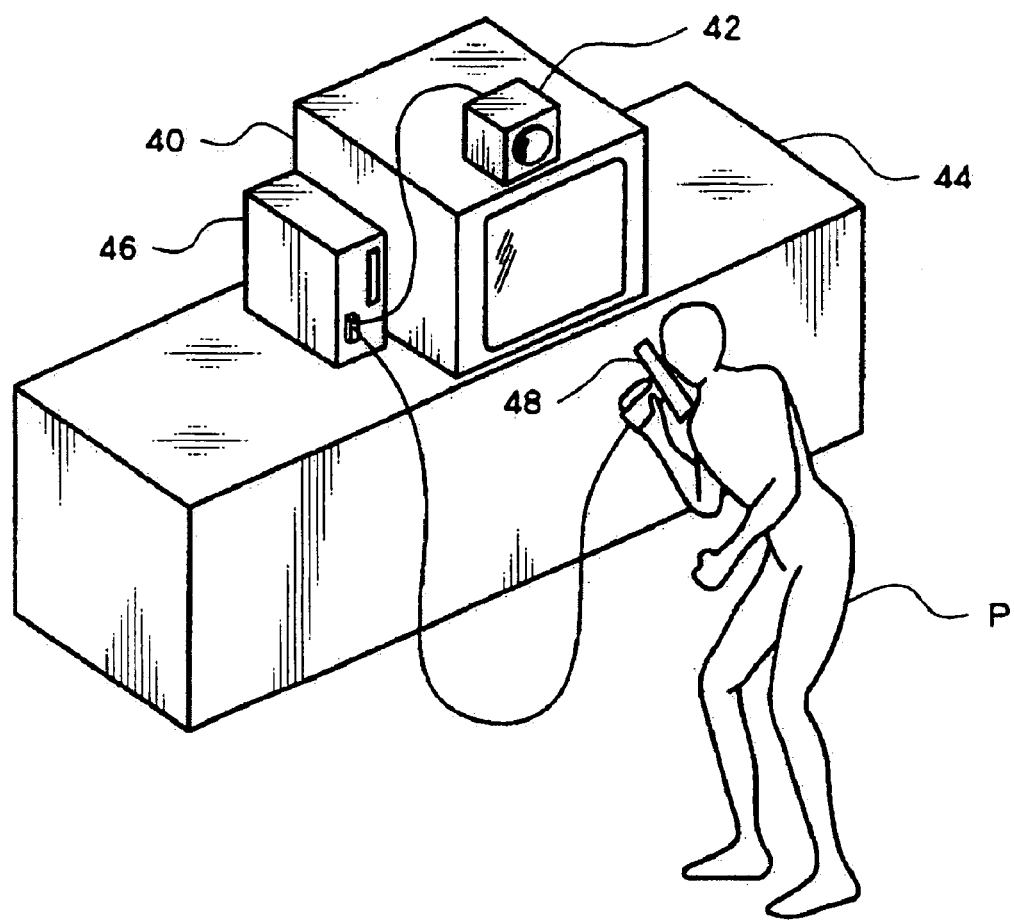
FIG. 1 is a diagram showing a player using a game apparatus according to an embodiment of the present invention and enjoying a gun-shooting game.
Figure 4A:
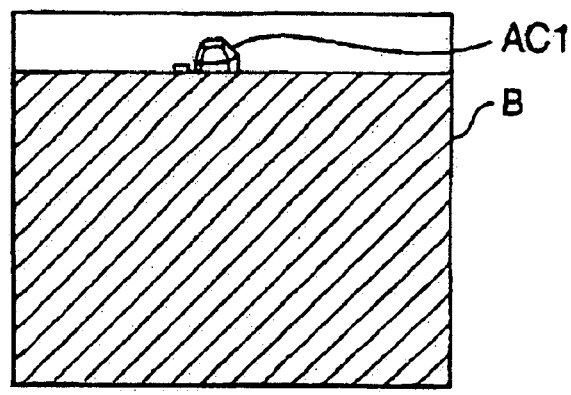
FIGS. 4A to 4D consist of several diagrams which illustrate an example of a game scene showing the case of a player moving in an up-down direction.
Figure 4B:
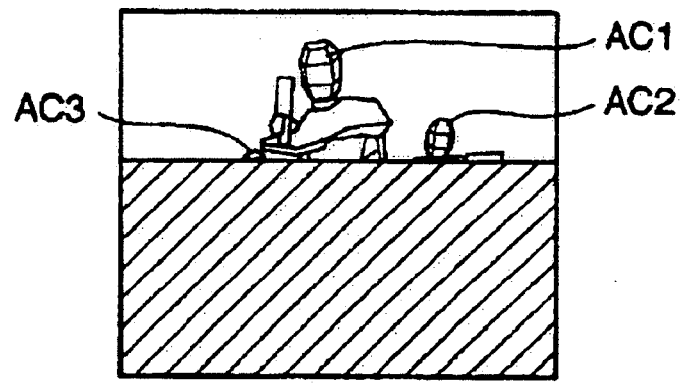
Figure 4C:
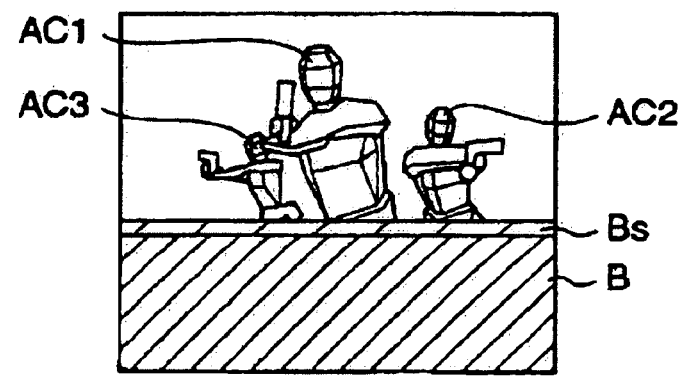
Figure 4D:
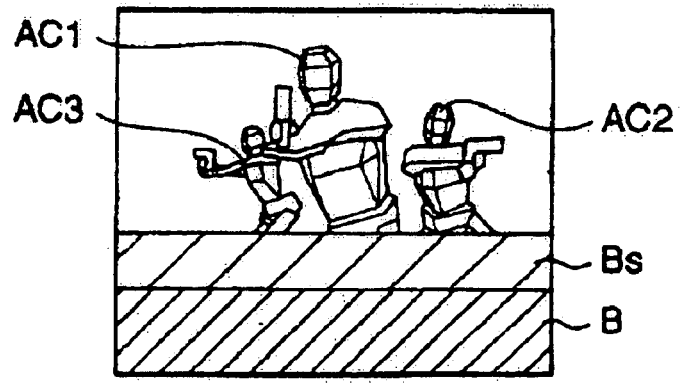
Figure 5A:
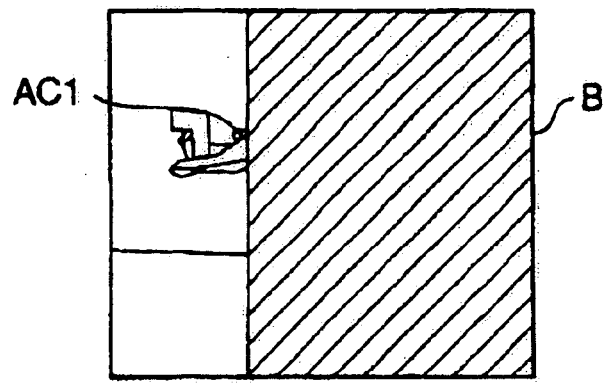
FIGS. 5A to 5D consists of several diagrams which illustrate an example of a game scene showing the case of a player moving in a transverse direction.
Figure 5B:
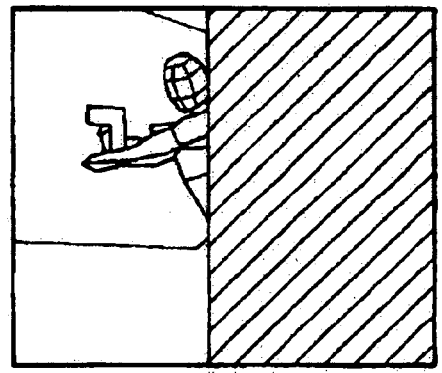
Figure 5C:
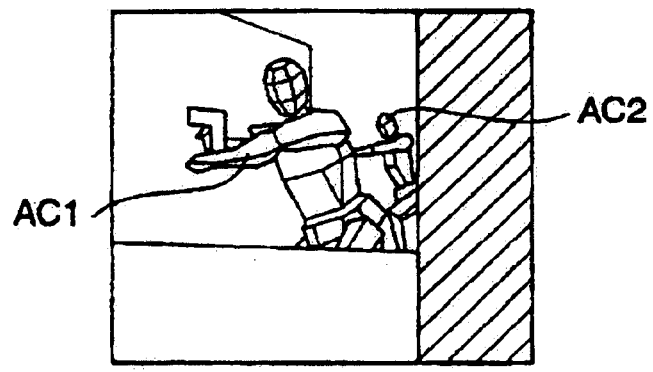
Figure 5D:
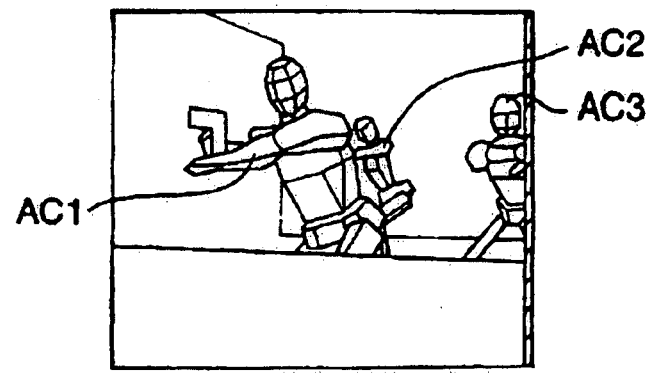

FIG. 1 is a perspective view illustrating the situation of a player using a game apparatus according to an embodiment of the present invention and playing a game. As shown in the same figure, the game apparatus is configured including home-use TV receiver 40 as a display, camera unit 42 as an image capturing means, home video game machine 46, and gun controller 48, and is a device for achieving a gun shooting game.

Home-use TV receiver 40 and home video game machine 46 are, for example, mounted on cabinet 44, and camera unit 42 in the present embodiment is mounted on top of home-use TV receiver 40. Camera unit 42 is a digital camera which captures images of the player's stance in real time and is connected to home-use game machine 46 by a cable. The digital camera has photoacceptor elements, such as charge coupled devices (CCD's), positioned in a 2-dimensional arrangement at the imaging position on the optical axis of a photographic lens and, with the proper exposure time, it acts as a device which captures optical images of the objects in the field of view (the player).

Home-use game machine 46 is connected to home-use TV receiver 40 which displays the game scenes generated by home-use game machine 46 and outputs the game music and game sound effects. In addition, it is arranged that, when performing normalizing processing of the standing position, the image of the player which was image-captured is provided in real time to home-use game machine 46. Gun controller 48 is a pistol-shaped game controller and is connected to the controller connection terminal of home-use game machine 46 by a cable. Player P holds gun controller 48 in his hand and when he points it at home-use TV receiver 40, its barrel direction is inputted into home-use game machine 46. In addition, gun controller 48 is provided with a trigger, and a signal indicating trigger status (trigger pulled or nor not) is inputted into home-use game machine 46.

With family-use video game machine 46, a 3-dimensional game space (virtual 3-dimensional space) is built in memory and it is arranged that the appearance of viewing the 3-dimensional space from the viewpoint of a simulated camera located at a specified spatial position is displayed on home-use TV receiver 40. At this time, home-use game machine 46 confirms the position of player P's head from the player image and performs viewpoint change processing to link above-mentioned viewpoint position to player's head position. As a result, when player P moves his body in front of camera unit 42, the game scene displayed on home-use TV receiver 40 changes in response to that, and player P can get a sense just as though he himself had entered into the 3-dimensional game space (a sense of "being there.") In this way, with home-use game machine 46, a game is achieved wherein player P, using gun controller 48, shoots the enemy characters who appear in the 3-dimensional game space and player P, by moving his body (specifically his head position), can dodge the incoming attack (shots) of the enemy characters.

FIG. 2 is a diagram showing the hardware configuration of game apparatus 10. As shown in that diagram, game apparatus 10 is configured by mounting DVD (Digital Versatile Disk, trademark) unit 25, which serves as an information storage medium, on home-use game machine 46, which is connected to monitor 18 and speaker 22, which are part of home-use TV receiver 40. Here, for supplying game programs and game data to home-use game machine 46, DVD unit 25 is used, but any other kind of information storage medium, such as CD-ROM (Compact Disk—Read Only Memory, trademark) or ROM (Read Only Memory) card, etc. could be used. In addition, it is possible to supply game programs and game data to home-use game machine 46 from a distant location, via a data communication network, such as the Internet.

Home-use game machine 46 is configured including microprocessor 14, image processor 16, main memory 26, input/output processor 30, peripheral device interface 31, audio processor 20, and DVD playback part 24. Microprocessor 14, image processor 16, main memory 26, input/output processor 30, and peripheral device interface 31 are connected by means of bus 12 which enables mutual data communication. Gun controller 48, audio processor 20, and DVD playback part 24 are connected to input/output processor 30. In addition, camera unit 42 is connected to peripheral device interface 31. The various elements which make up home-use game machine 46 are contained within a cabinet. Here, as monitor 18, home-use TV receiver 40 is used, and as speaker 22, its internal speaker is used.

Microprocessor 14 controls each part of home-use game machine 46 based on an operating system stored in a ROM (not shown in the figure) and the game program read out from DVD 25. Bus 12 is for the exchange of addresses and data between the various parts of home-use game machine 46. In addition, game programs and game data read out from DVD 25 are written into main memory 26 as necessary. Image processor 16 is configured including VRAM (Video Random Access Memory) and, receiving image data sent from microprocessor 14, plots game scenes in VRAM. Image processor 16 also converts that content into video signals and outputs them to monitor 18.

Image processor 16 calculates the coordinate positions, etc. of each character (enemy characters, physical "characters" such as the various buildings positioned in the game space, etc.) viewed from the viewpoint of the simulated camera within the simulated 3-dimensional space. From the calculated coordinate positions in the simulated 3-dimensional space, image processor 16 also performs the calculations for converting to coordinate positions in 2-dimensional space and performs positioning processing of the polygons which constitute the images to be plotted in the display buffer of main memory 26. In addition, image processor 16 performs texture mapping in regard to each polygon. As information on the viewpoint of the simulated camera for calculation of character coordinate positions, position information on the player's marked region for example his head, is transmitted from position recognizing part 71 which will be explained later. Consequently, the viewpoint of the simulated camera substantially matches the eye of the player, and in this embodiment, a character corresponding to the player does not appear on the monitor screen.

Input/output processor 30 is an interface for relaying data communications between gun controller 48, audio processor 20, DVD playback part 24, and microprocessor 14. As shown in FIG. 1, gun controller 48 is a pistol-shaped game controller and is used for inputting into home-use game machine 46 the trigger status and barrel (muzzle) direction (specifically, the position on the screen of home-use TV receiver 40 at which the barrel is pointed). For gun controller 48, a commonly known configuration can be used, for example. In other words, when player P pulls the trigger of gun controller 48, that information (trigger signal) is inputted into home-use game machine 46 from the controller terminal. Then, in home-use game machine 46, when that trigger signal is inputted, by means of the game program, for example, a scene of a specific color (for example, white) is displayed for just one frame, and as a result, a spot is scanned on the screen of home-use TV receiver 40. By providing a highly directional photosensor deep inside the barrel of gun controller 48 and, with that sensor, detecting the spot on home-use TV receiver 40, the time from the instant of starting the scan to the instant of detecting the spot is calculated and, from that, the position (coordinates) of the spot on the screen of home-use TV receiver 40 is calculated. Then, by inputting that position, in other words the direction of the gun barrel, into home-use game machine 46, gun controller 48 can be suitably achieved. Note that it is best if the instant of starting the scan is obtained from a synchronization signal included in the video signal supplied from home-use game machine 46 to home-use TV receiver 40.

Then, calculation of the trajectories of bullets shot by the player through the game space of the screen of TV receiver 40 is performed in order; and preferably, for each calculation, by displaying the bullet in the scene or by a like means, it can be judged whether an enemy character in the scene has been hit or not. The decision as to whether or not there has been a hit is made by finding a coordinate match, or a substantial coordinate match, between the results of successive bullet trajectory calculations and enemy character position coordinates.

Audio processor 20 is configured including a sound buffer, and data such as music, game sound effects, etc., which have been read out from DVD 25 and stored in the sound buffer are played back and outputted from speaker 22. DVD playback part 24, in accordance with instructions from microprocessor 14, reads out game programs and game data stored in DVD 25. Peripheral device interface 31 is an interface for connecting various peripheral devices to home-use game machine 46 and can use a USB (Universal Serial Bus) interface, for example. In this case, camera unit 42 is connected to peripheral device interface 31. Camera unit 42 is, for example, a commonly known digital camera for inputting gray scale photographic images (256 gradations of black and white) into home-use game machine 46 at specified time intervals (for example, every $\frac{1}{60}^{th}$ of a second, etc.) In the present case, in order to image capture the stance of player P, this camera unit 42 is mounted on top of home-use TV receiver 40 in the state where its lens is pointed at player P.

Here will be explained the processing done by home-use game machine 46 for displaying the title screen. This processing is executed based on the game program stored in DVD 25.

FIG. 3 is a diagram showing the software configuration of the microprocessor 14. In FIG. 3, microprocessor 14 comprises initial play position setup part 70, position recognizing part 71, filter processing part 72 and viewpoint change processor 73. The functions of each part are performed based on the game program stored in DVD 25. Position recognizing part 71 comprises the several parts from image capture control part 7111 to center of gravity calculating part 7123. Filter processing part 72 comprises the several parts from information updating part 7211 to buffer size determining part 7214.

Figure 6:
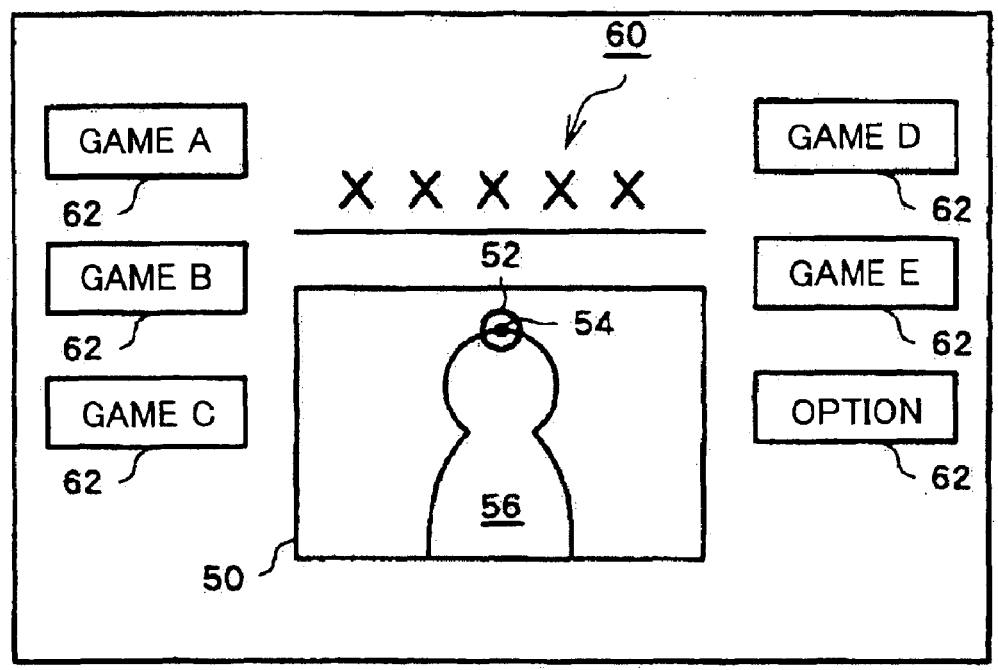
FIG. 6 is a diagram showing an example of a title screen (start screen)

Initial play position setup part 70 is a means for performing initial calibration processing to normalize the player's standing position. Thus, as shown in FIG. 6, in a specified position on monitor 18, it displays "player standing position guide image" 50 and in a specified position in that image 50, which in the present embodiment is slightly above the center, it displays "head reference position marker" 52 shown, for example, by a circular marker. It also displays, superimposed on the above image, player image 56, image-captured by camera unit 42, and "present recognized position marker" 54, obtained from that image 56 and shown, for example, as a round dot. By changing the standing position or stance of player P, or the photographing direction or photographing position of camera unit 2, present recognized position marker 54 moves into circularly-shaped head reference position marker 52. Whereupon the display appearance of head reference position marker 52 is changed (for example, turning ON or OFF a colored or flashing display) indicating that the reference position (initial play position) has been normalized.

Next, in FIGS. 4A through D, is shown a series of game scenes displayed on home-use TV receiver 40 for the case that player P's head moves in an up-down direction. In FIGS. 4A through 4D of the same figure, four scenes are shown in the order of their display for the case that player P, in front of camera unit 42, rises from a crouched stance gradually to an almost fully upright stance—in other words, for the case that player P's head moves from a lower position to a higher one. In the game scene shown in FIG. 4A of the same figure, table-shaped barrier B exists immediately in front of the viewpoint, expressing the situation that player P is hiding in front of the lower part of this barrier B. In this case, only a part of the head of enemy character AC1, who is behind barrier B holding a gun in his hand, appears in the game scene. Next, the game scene shown in FIG. 4B of the same figure shows the situation where player P has raised his head a small amount, so that the level of his head is about the same as that of the upper surface of barrier B. In this case, enemy character AC1 becomes visible down to his chest while behind him the heads of two more enemy characters, AC2 and AC3, newly appear in the game scene. The game scene shown in FIG. 4C of the same figure shows the situation where player P has straightened up more and raised his head. In this case, player P's head is in a slightly higher position in the game scene than the barrier upper surface Bs. The upper bodies of the three enemy characters, AC1 through AC3, are visible and the barrier upper surface Bs also appears. The game scene shown in FIG. 4D of the same figure shows the situation where player P is essentially in a fully upright stance. In this case, the head and shoulders of player P are exposed above barrier B and barrier upper surface Bs is visible to a greater extent than in the game scene shown in FIG. 4C of the same figure. As shown in these figures, as the position of player P's head rises, the display position of barrier B moves lower, and a more complete view of barrier upper surface Bs and enemy characters AC1 through AC3 gradually appears in the game scene.

Next, FIGS. 5A through 5D show an example of a series of game scenes displayed on home-use TV receiver 40 in the case that player P's head moves in a right-left direction. In FIGS. 5A through 5D of the same figure, four scenes are shown in the order of their display for the case that player P, in front of camera unit 42, moves his body from the right side to the left side, in other words, for the case that player P's head moves from the right side to the left side. In the game scene shown in FIG. 5A of the same figure, door- or wall-shaped barrier B exists immediately in front and at the right side of the viewpoint, expressing the situation that player P is hiding in front of this barrier B. In this case, only a part of the arm of enemy character AC1, who is behind barrier B holding a gun in his hand, appears in the game scene. Next, the game scene shown in FIG. 5B of the same figure shows the situation where player P has moved to the left somewhat, so that his head is about even with left edge of barrier B. In this case, the head and chest of enemy character AC1 become visible in the game scene. The game scene shown in FIG. 5C of the same figure shows the situation where player P has moved further to the left. The upper body of enemy character AC1 becomes visible and enemy character AC2 also appears behind him. The game scene shown in FIG. 5D of the same figure shows the situation where player P is essentially in a fully upright stance. In this case, player P has jumped out to the left from barrier B and, in addition to enemy game characters AC1 and AC2, enemy game character AC3 has additionally appeared.

As shown in these figures, as the position of player P's head moves from left to right, the display position of barrier B moves to the right side and correspondingly the display position of barrier B moves to the right and full views of enemy characters AC1 through AC3 gradually appear.

FIG. 6 is a diagram showing an example of the game title screen (start screen) supplied by home-use game machine 46. The title screen shown in the same figure is displayed on home-use TV receiver 40 after start up of home-use game machine 46 or after game completion and before the start of a new game. As shown in the same figure, on both sides of the screen in this title screen, images of menu buttons are displayed and in the upper part of the center, game title text line 60 is displayed. In addition, under title text line 60, player "standing position guide image" 50 is displayed. In addition, menu buttons 62 are objects to be operated to select various games or set options, and when player P, by means of controller 48 shoots menu button image 62, the game or option setting corresponding to that menu button image 62 is started.

Player "standing position guide image" 50 is displayed by means of initial play position setup part 70 and is an image for assisting player to normalize his standing position prior to game start. Prior to start of the game, player P, looking at this same "standing position guide image" 50, corrects his standing position or stance in front of camera unit 42 or corrects the picture-taking angle or position of camera unit 42. Initial play position setup part 70, based on real-time images acquired by camera unit 42 from image capture controller 7111, in other words, based on player image 56, aligns and displays head reference position marker 52 and present recognized position marker 54. Head reference position marker 52 is a circular mark displayed in a fixed position of player image 56 (for example in the center of player image 56 at a position 15% from the top, etc.) Its purpose is to show the location in player image 56 where the image position of player P's head (top part of his head) should be aligned, prior to start of the game. Likewise, with this game apparatus 10, it is arranged that the present position of player P's head can be recognized from player image 56 and the circular dot indicating that recognized position is displayed superimposed as "present recognized position marker" 54 on player image 56. Player P, by moving his own body (standing position or stance) or changing the picture-taking direction or position of camera unit 42, can make present recognized position marker 54 move into circular head reference position marker 52. Initial play position setup part 70 determines whether present recognized position marker 54 is displayed inside head reference position marker 52. It is made so that, depending on that result, it changes the display appearance of head reference position marker 52 (for example, turning ON or OFF a color or flashing display). In this way, it is arranged that player P, while viewing player standing position guiding image 50, can readily normalize the positional relationship of himself and camera unit 42, prior to start of the game.

Here is explained the processing of home-use game machine 46 for displaying the title screen. This processing is performed based on the game program which has been stored in DVD 25.

Figure 7:
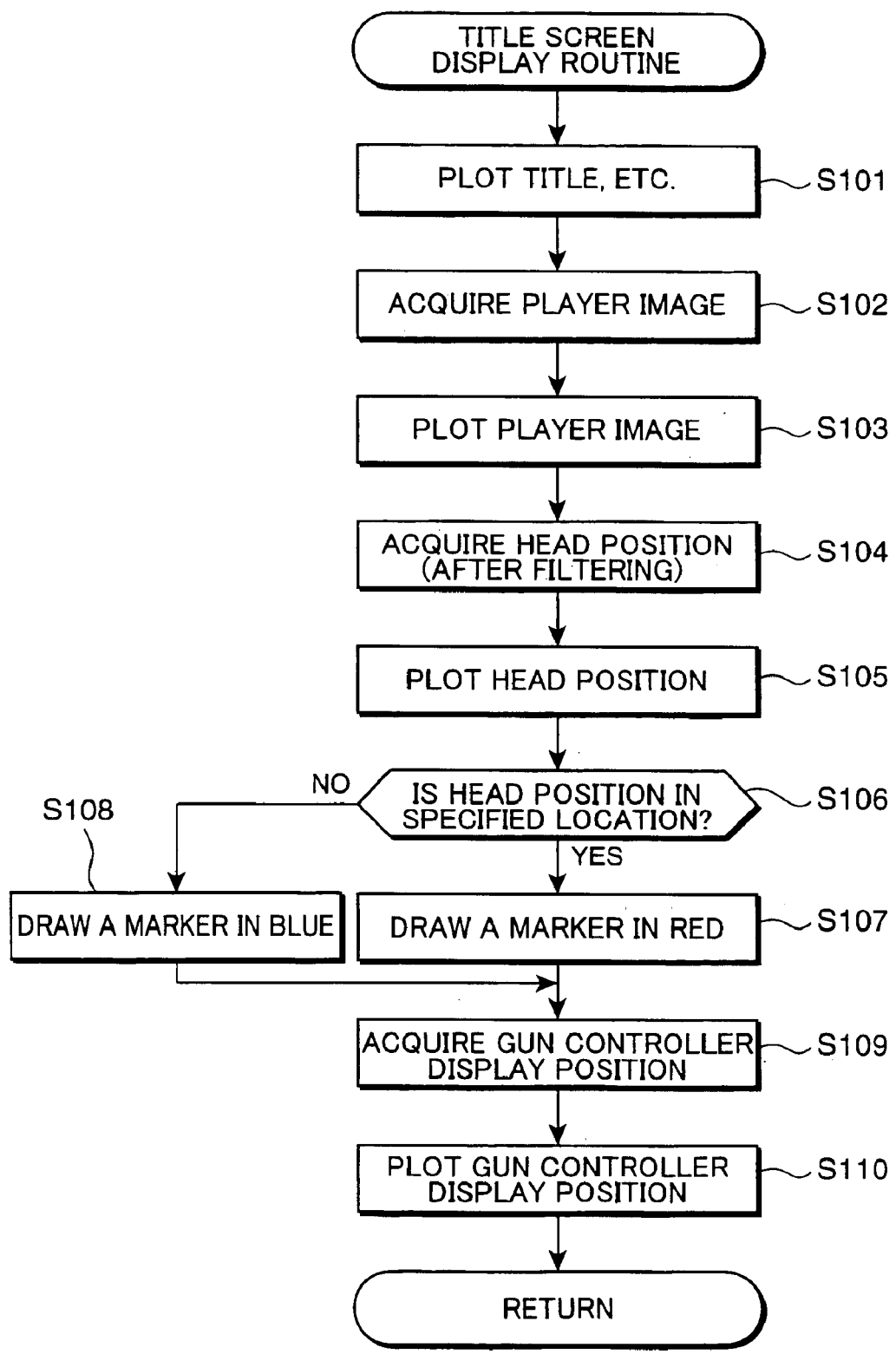
FIG. 7 is a flow diagram describing title screen display processing.

FIG. 7 is a flow diagram describing game title screen display processing by home-use game machine 46. As shown in the same figure, with home-use game machine 46, first, microprocessor 14 plots the background image of the title screen, title text line 60, menu button images 62, copyright indication, etc. into VRAM which is included in image processor 16 (S101). Next, the image to be captured by camera unit 42 (here, the object is to photograph player P, so this is called a "player image") is captured (S102). Then, the player image captured in S102 is plotted into VRAM (S103), so that the player image is positioned in the "player standing position guide image" 50 position in the title screen.

Further, based on the player image captured in S102, the position of player P's head (head position) is recognized and information after filter processing the recognition results (filter processed head position) is acquired (S104). The position recognition processing and filter processing mentioned here will be explained in detail later. Afterward, microprocessor 14 draws the "present recognized position marker" 54 at the VRAM coordinates corresponding to the filter processed head position (S105), so that a marker (red point) is displayed at head position of the player image included in the title screen.

Next, initial play position setup part 70 determines whether the filter processed head position is in the reference position. The reference position is the position in the player image where player P's head should appear prior to start of the game. Then, if the filter processed head position is in the reference position, a red-colored head reference position marker 52 is plotted at the reference position of the player image already plotted in the VRAM (S107). On the other hand, if the filter processed head position is not in the reference position, a blue-colored head reference position marker 52 is plotted at the reference position of the player image (S108). Afterward, the gun barrel direction of gun controller 48 is acquired (S109), and aiming marker is 58 is drawn in that position (S110).

Figure 8:
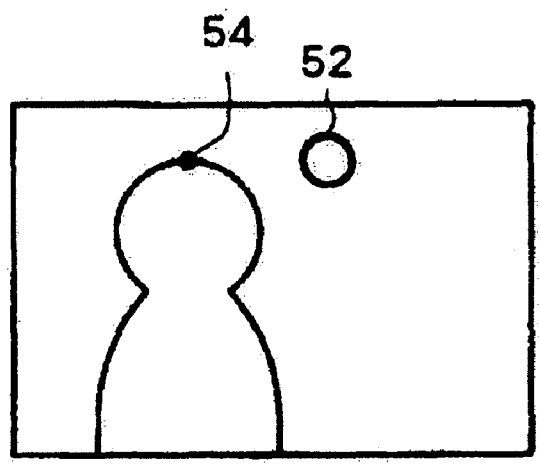
FIG. 8 is a diagram illustrating an example of the "player standing position guide" image included in the title screen.

If the above is done, in the case that the positional relationship between player P and camera unit 42 is not appropriate, as shown in FIG. 8, "present recognized position" marker 54 will be displayed outside circular head reference position marker 52 in the title screen and head reference position marker 52 will be displayed in blue. On the other hand, in the case that the positional relationship between player P and camera unit 42 is appropriate, as shown in FIG. 6, "present recognized position" marker 54 will be displayed inside circular head reference position marker 52 in the title screen and head reference position marker 52 will be displayed in red. In this way, by changing his standing position or changing the mounting position or camera-direction of camera unit 42, so that head reference position marker 52 is made to be displayed in red in the title screen, player P can readily normalize the positional relationship between himself and camera unit 42.

If the positional relationship between player P and camera unit 42 is not normalized, when player P bends, stoops or shifts his body right or left during the game, his head position may not fit into the player image with the result that the correct head position could not be recognized. However, with present game apparatus 10, the positional relationship of player P and camera unit 42 can be normalized prior to start of the game. As a result, even when player P bends, stoops or shifts his body left or right during the game, his head position can be correctly recognized.

Figure 9:
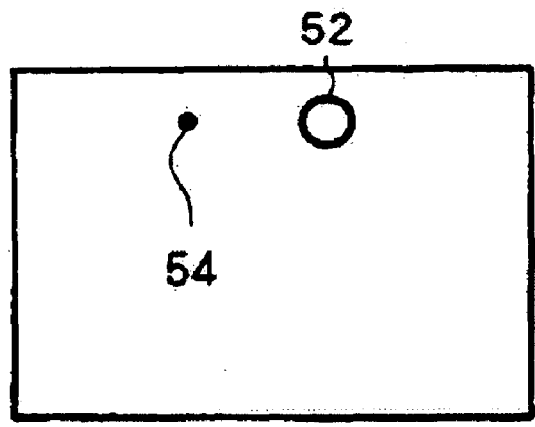
FIG. 9 is a diagram showing a variation of the "player standing position guide" image included in the title screen.

Note that the guidance given to player P need not be limited to that explained above. For example, as in the guidance image shown in FIG. 9, it is acceptable to display only present recognized position marker 54 and head reference position marker 52, without displaying the player image. In addition, instead of changing the display appearance of head reference position marker 52 according to the positional relationship of present recognized position marker 54 and head reference position marker 52, it is acceptable to change the display appearance of present recognized position marker 54 (color or flashing pattern). Alternatively, it is acceptable to provide a display in a separate location, responsive to the positional relationship of present recognized position marker 54 and head reference position marker 52. It is also acceptable to omit display of the present recognized position marker 54.

Furthermore, it is also acceptable to display only present recognized position marker 54 and to change the display appearance of present recognized position marker 54 when present recognized position marker 54 moves into the position where head reference position marker 52 should properly be displayed. Even if this approach is taken, player P can correct the positional relationship between himself and camera unit 42 while watching the guidance image.

In addition it is acceptable if the arrangement is that, according to the relationship between the present recognized position of player P's head and the reference position, a message, for example "Please move to the right," or "Please move to the left" or "Please move forward," or "Please move backward," is displayed. Also, the shapes of present recognized position marker 54 and head reference position marker 52 are not limited to those described above, but a variety of kinds of shapes can be adopted. Furthermore, the guidance for player P can be provided prior to start of the game. To do that, the guidance for player P may be provided, for example, on a different screen from the title screen.

Next will be explained player image processing in home player game machine 46.

Figure 10:
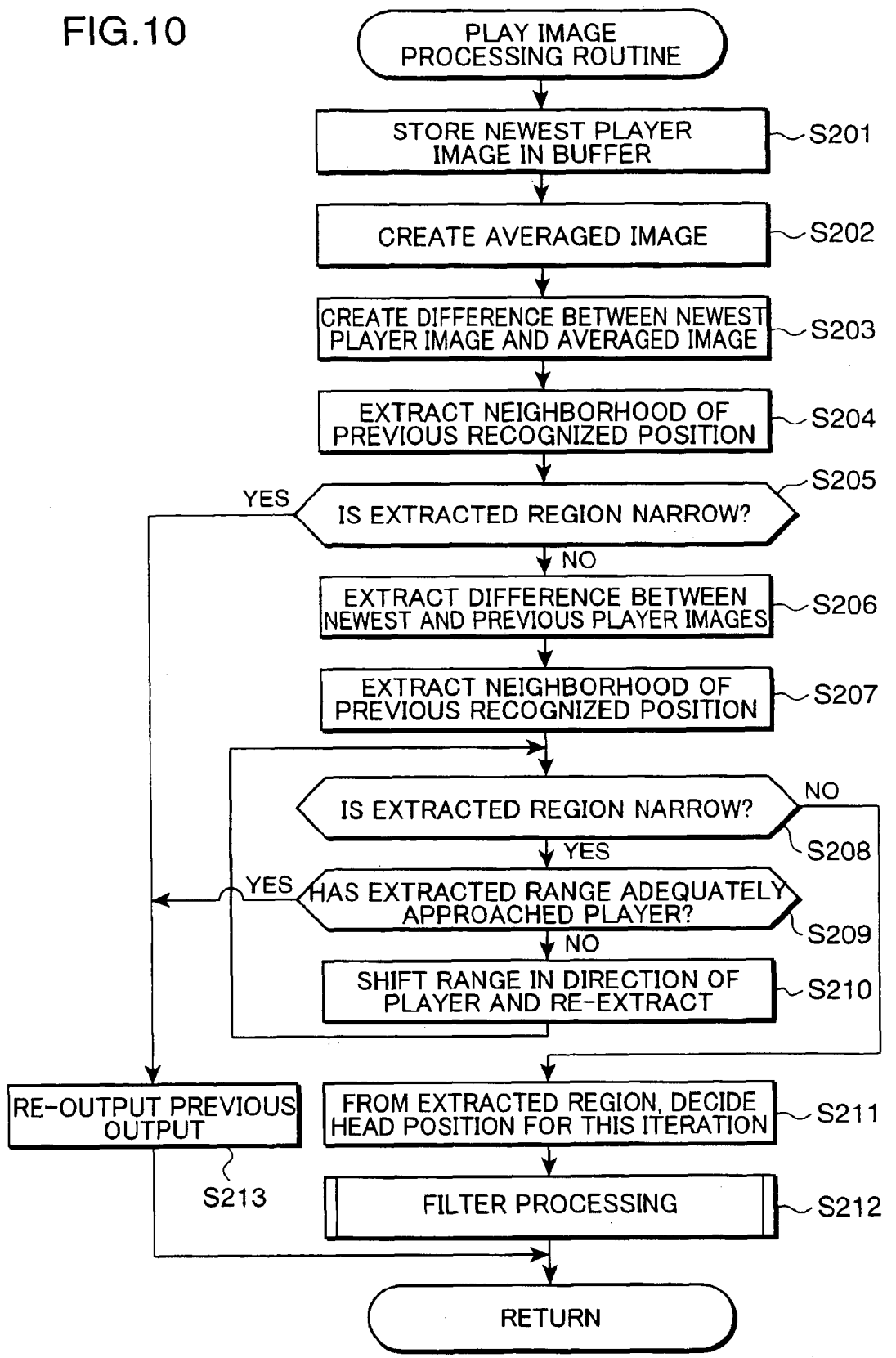
FIG. 10 is a diagram describing processing of the player image.
Figure 11:
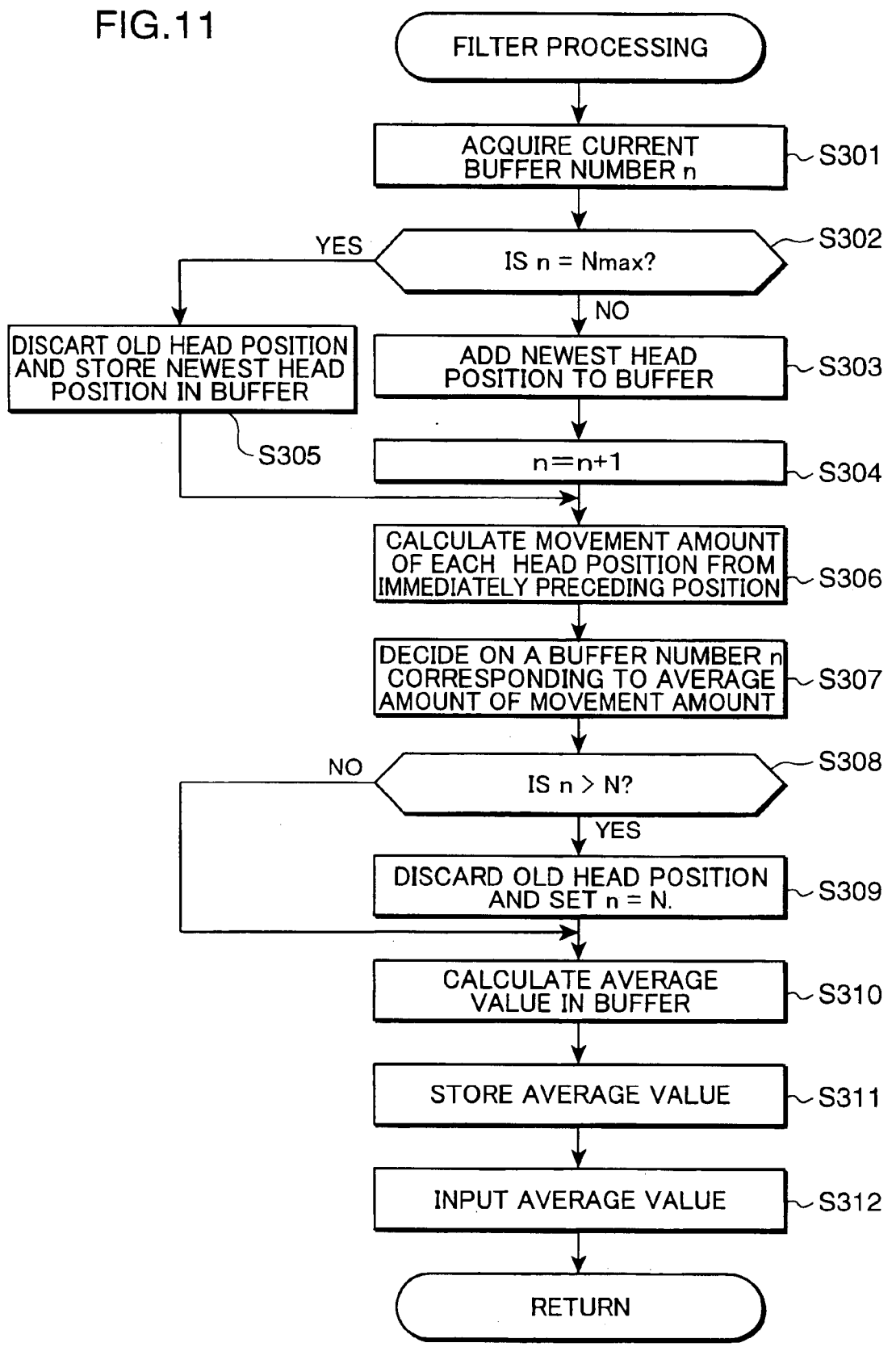
FIG. 11 is a diagram describing filter processing related to the recognized position.
Figure 12A:
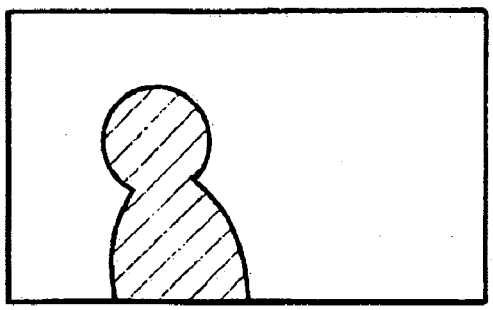
FIGS. 12A to 12D are diagrams showing a series of player images.
Figure 12B:
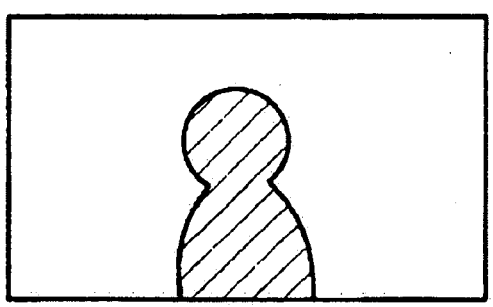
Figure 12C:
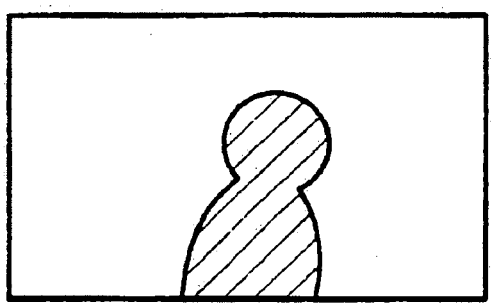
Figure 12D:
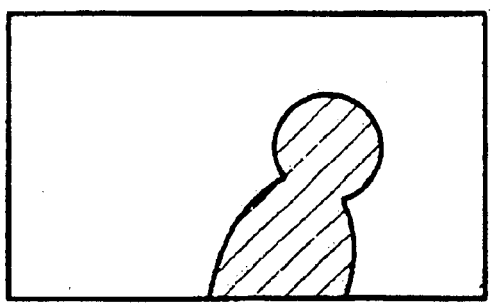

FIG. 10 is a flow chart which describes the processing which, based on the player image acquired from camera unit 42, subject to control by the image capture control part, recognizes the head position of player P and performs filtering of the recognition results. Likewise, FIG. 11 is a flow chart which describes the filter processing in detail. In accordance with the game program stored in DVD 25, the various processing is executed in home-use game machine 46, at specified time intervals (for example, every $1/60^{th}$ of a second) as controlled by timer 7112.

When the player image has been acquired by camera unit 42, captured image fetching part 7113, as shown in FIG. 10, first stores that player image in an image buffer prepared in main memory 26 (S201). This image buffer is for the purpose of storing in memory the images acquired by camera unit 42 at specified time intervals. It stores in time sequence, a specified number of (here, a total of 4) player images, including the newest player image. Then, when the newest player image is acquired, that player image is added to the image buffer and at the same time the oldest player image is discarded. FIG. 12 is a diagram showing a series of player images stored in the image buffer. In the sub-figures of FIG. 12, the following are shown: in FIG. 12A of that figure, the newest player image; in FIG. 12B of the same figure, the preceding player image; in FIG. 12C of the same figure, the player image preceding that one; and in FIG. 12D of the same figure, the player image even preceding that one (that is, the oldest player image in the buffer). The example shown in that figure shows the situation where player P sways his body from left to right in front of camera unit 42.

Figure 13:
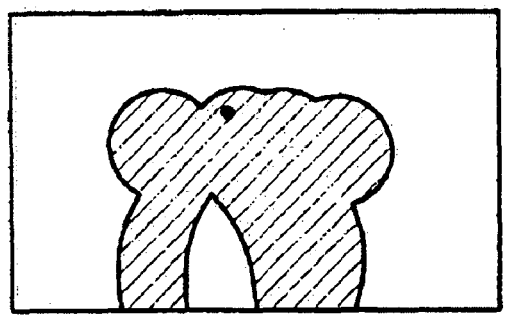
FIG. 13 is a diagram showing the differential image between the newest image and an averaged image.
Figure 14:
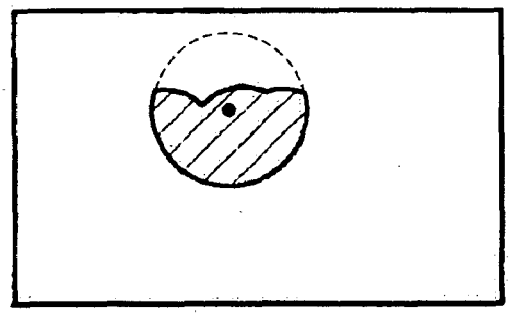
FIG. 14 is a diagram showing the results of extracting the previously recognized position neighborhood from the image shown in FIG. 13.

Next, averaging processor 7114 generates an average of the three player images which are the player images stored in the image buffer excepting the newest image (S202). In this embodiment, the averaged image is an image obtained by averaging the color information (256 monochrome gradations) given to each picture element [pixel] corresponding to the three player images. As will be explained later, this number, 3, has been found to be suitable experientially and experimentally, based on the movement of player P and the image-fetching period of $1/60^{th}$ of a second. Then, by means of first differentiator/binary converter 7115, the difference between this averaged image and the newest player image is generated (S203). This differential image is the image obtained by subtracting the color information given to the corresponding pixels in these two images, magnitude-comparing it to a threshold value, and converting it to binary (to monochrome). FIG. 13 is one example of this differential image. Then, by means of image extractor 7116, an image with a specified radius centered on the previous recognized position (the position of player P's head) is extracted from this differential image (S204). FIG. 14 is an example of this extracted image. In this drawing, the black dot shows the previous recognized position and in fact, it is not shown in the extracted image.

Figure 15:
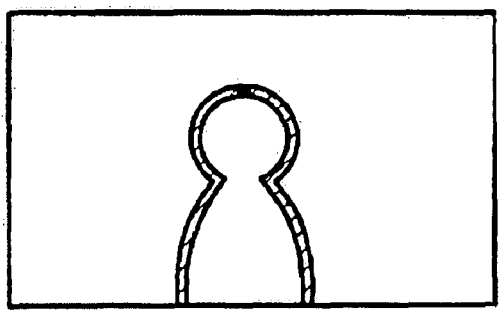
FIG. 15 is a diagram showing the differential image between the newest image and an averaged image in the case that player movement is small.
Figure 16:
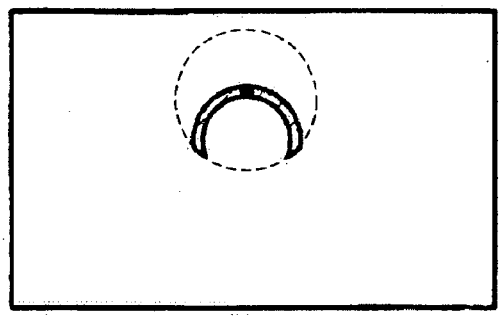
FIG. 16 is a diagram showing the results of extracting the previously recognized position neighborhood from the image shown in FIG. 15.

Next, area determining part 7117 checks whether or not the area of the region shown in black in the extracted image (the region where a difference remains) is below a specified threshold or not (S205). Then, if the area of the region shown in black in the extracted image is below the specified threshold, re-outputting part 7118 re-outputs the previous output (filter processed head position) which has been stored ahead of time in main memory 26 (S213). In the case that player P's amount of movement is small, as shown in FIG. 15, only a differential part corresponding to player P's outline remains as the differential image obtained in S203. In this case, by extracting the neighborhood of the previous recognized position, that area becomes small, as shown in FIG. 16. In the processing from S202 to S205, when, as shown in FIG. 16, the amount of movement is small, the previous output is re-outputted and changing of the output value is suppressed.

Figure 17:
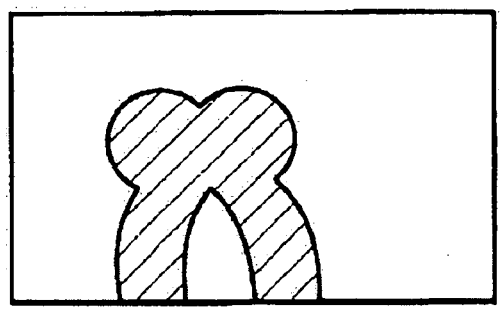
FIG. 17 is a diagram showing the differential image between the newest image and the immediately preceding image.
Figure 18:
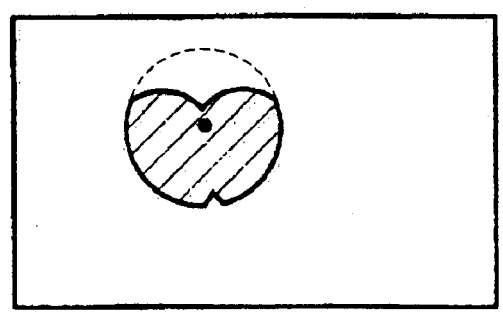
FIG. 18 is a diagram showing the result of extracting the previously recognized position neighborhood from the image shown in FIG. 17.

On the other hand, in the case that the area shown in black in the extracted image exceeds a certain threshold, next the newest player image (in FIG. 12A) and the player image immediately preceding that (in FIG. 12B) are read out of the image buffer, and a differential image of them (image converted to binary) is generated (S206) by means of second differentiator/binary converter 7119. FIG. 17 is a diagram showing one example of this differential image. Then, from this differential image, image extractor 7116 extracts an image (the selected image) of a specified radius centered on the previously recognized position. This specified radius may be the same as the previously described specified radius adopted for use in the decision-making of area determining part 7117, or it may be set at a somewhat larger value, considering that the amount of motion may be large. FIG. 18 shows an example of this extracted image. In this figure, the black circular dot indicates the previous recognized position and it is not actually displayed in the extracted image. The position of the pixels shown in black in the extracted image is used in recognizing the head location of player P in S211. In other words, this extracted image includes the foundation position group at the time that head position of player P is recognized. Then, player head position is found from the foundation position group pixels.

Figure 19:
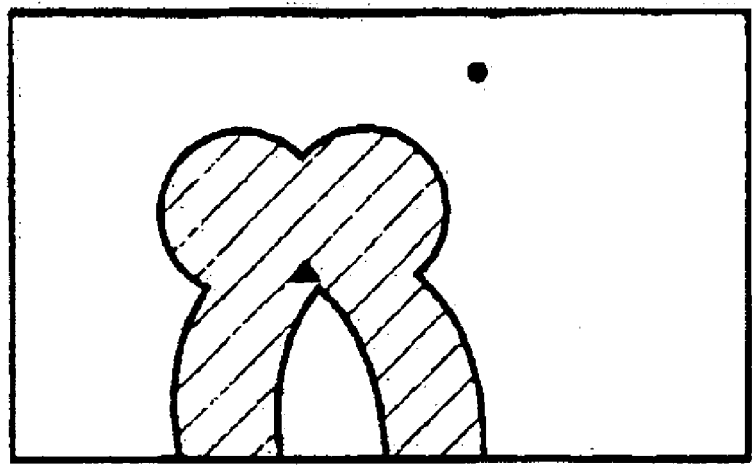
FIG. 19 is a diagram showing the differential image between the newest image and the immediately preceding image, in the case that the previously recognized position is separated from the newest player image and the immediately preceding player image.
Figure 20:
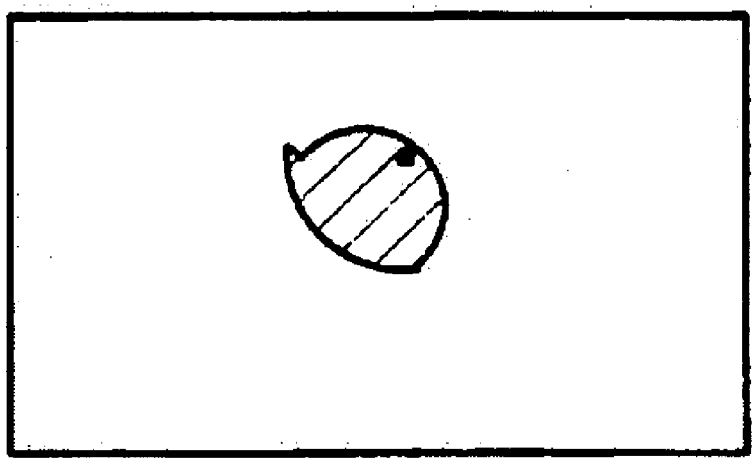
FIG. 20 is a figure showing the result of extracting, from the image shown in FIG. 19, a position closer to the player from the previously recognized position.

Change amount calculator 7120 calculates the amount of change in the region shown in black in this extracted image (foundation position group; region where difference remains). According to the present embodiment, height and width are measured, and those values are respectively checked by change determining part 7121 as to whether or not they are under specified threshold values (S208). If it is found by change determining part 7121 that either of these values is below the specified threshold, the extracted range (selected range) is moved by image movement processor 7122 in the direction of player P until the extracted range (selected range) is sufficiently close to player P (S209) and the extracted image is regenerated (S210). Specifically, the center of gravity of the region shown in black in the differential image of S206 (image converted to binary) is calculated by center of gravity calculator 7123 and the center of the extracted range (selected range) is moved in specified distance increments from previous recognized position toward that center of gravity. FIG. 19 is a diagram for explaining the nature of that processing. In it, the region which has been hatch marked is the region where a difference remains and the black triangle indicates the position of the center of gravity of the differential portion, while the black dot indicates the previous recognized position. The same figure shows the appearance of a sudden movement of player P from the upper left to the lower right in front of camera unit 42. In S210, in such a case, the center of the extracted range (selected range) is gradually moved from the position of the black spot in the same figure in the direction of the black triangle by means of image movement processor 7122. Then, in the case that, even if it is moved a distance that is a specified fraction of the distance between the previous recognized position and the center of gravity, for example, 70%, the region shown in black in the extracted image remains narrow, as before, the output of the previous time will be re-outputted (S213). On the other hand, if as a result of shifting the extracted range (selected range), both the height and width of the region shown in black in the extracted image come to exceed their respective specified threshold values, as shown in FIG. 20, the head position for this iteration is determined from the extracted image of that time (S211). For example, a position in the center of the region shown in black in the selected image and a few pixels down from the top is selected as the head position for this iteration. Afterward, filter processing is performed on the head position of this iteration, which was selected (recognized) in this way, and the head position after filter processing is outputted (S212).

If the above approach is followed, as a general rule, a foundation position group is selected within the selected range corresponding to the recognized position of the previous time, and as an exception, the foundation position group is re-selected, changing the selection range. Even in the case that in the player image a moving object other than the player is image-captured, its influence can be rejected and even in the case that the head position has moved particularly quickly, appropriate position recognition can be done.

Figure 21A:
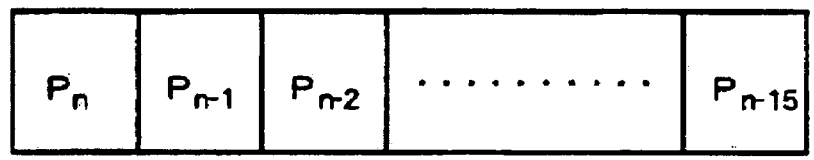
FIGS. 21A and 21B are diagrams showing the memory content of the "recognized position" buffer.
Figure 21B:
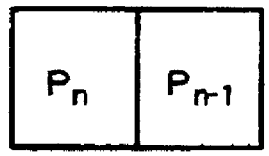

Next, in the above-described filter processing, as shown in FIG. 21A, a head position buffer is provided in main memory 26, and, by means of information updating part 7211, this buffer stores a maximum of 16 head positions (Pn through Pn−15; where the appended characters correspond to the recognition time). This head position buffer is for storing the head positions of player P, recognized every specified time period, and in the buffer are stored in time sequence a maximum of 16 head positions, including the newest head position. Then, when the newest head position is recognized, that head position is additionally stored in the head position buffer and, at the same time, the oldest head position is discarded. For example, in the situation of FIG. 21A of the same figure, when head position Pn+1 is recognized, that head position Pn+1 is additionally stored in head position buffer and the oldest head position, Pn−15 is discarded from the head position buffer. In addition, with this head position buffer, the buffer size (in other words, the number of stored head position "units") is variable. In the present embodiment, for example, as shown in FIG. 21B of the same figure, the states of 2 units, 4 units, and 8 units can be arranged, while as shown in FIG. 21B of the same figure, the state of 16 units can be arranged, thus providing a total of four possible storage states.

As shown in FIG. 11, with the filter processing, first, n [head positions] are acquired, equal to the current buffer size of the head position buffer (S301). Then, if current buffer size n is equal to the maximum size Nmax (here, 16) (S302), by means of information updating part 7211, the oldest head position is discarded from the head position buffer, and the newest head position is additionally stored in the head position buffer (S305). On the other hand, if, as determined of buffer size determining part 7214, the current buffer size n is not equal to maximum size Nmax, the oldest head position is not discarded, but the newest head position is additionally stored in the head position buffer (S303), and 1 is added to the current buffer size of n (S304).

Next, the amount of movement of each head position stored in the head position buffer is calculated (S306). Specifically, by means of movement amount calculator 7212, the distance between each head position and the head position immediately preceding it is calculated. For example, in the example of FIG. 21, the distance between head position Pn and head position Pn−1, the distance between head position Pn−1 and head position Pn−2, the distance between head position Pn−2 and head position Pn−3, . . . , and the distance between head position Pn−14 and Pn−15 are calculated. (In the case that 16 pieces of data are not all there (for example, if some are discarded), it is performed with the available data.) In addition, movement amount calculator 7212 calculates an average of the calculated movement amounts and next, by means of buffer size determining part 7213, buffer size N corresponding to that value is determined (S307). In the present embodiment, if the average value is 11 or more, the buffer size is set at N=2; if 9 or more, but under 11, buffer size is set at N=4; if 7 or more, but under 9, buffer size is set at N=8; and, if under 7, buffer size is set at N=16. Note that here it has been arranged such that buffer size N is determined based on the average of the movement amounts of the head positions stored in the head position buffer, but it would be acceptable to adopt another calculation method. For example, it would be acceptable if the movement amount of each head position were given weight, and the objects of movement amount calculations were limited to comparatively new ones from among the head positions stored in the head position buffer. In this way, it could be arranged that, in cases where it is determined that the newest head position moved suddenly, buffer size N would immediately decrease in size.

Next, buffer size determining part 7214 compares the current buffer size n and buffer size N (S308). If current buffer size n is larger than buffer size N, head positions stored in the head position buffer are discarded in order from the oldest ones, so that current buffer size n becomes buffer size N (S309). On the other hand, if current buffer size n is equal to or less than N, S309 is skipped. Afterward, the head positions stored in the head position buffer are averaged and those values are stored in main memory 26 as "previous output" (S311) and are outputted as filter processed head positions (S312). As explained above, the filter processed head positions are used in determining viewpoint position when a 3-dimesional space is plotted. In addition, they are used when determining the display position of present recognized position marker 54 when displaying player standing position guide image 50 in the title screen. Note that, here, the average value of head positions stored in the head position buffer is considered to be the filter processed head position. However, it would also be acceptable to attach weight to the head positions stored in the head position buffer, for example making it such that the influence of the newest head position in determining the filter processed head position would be greater.

Because, through the above-described filter processing, it was made such that an average value of head positions stored in the head position buffer is outputted, it is possible to suppress variation in the value of the filter processed head position. In addition, because it was made such that the size of the head position buffer changes according to the movement amounts of the head positions stored in that head position buffer, in the case that the head position of player P moves suddenly, the value of the filter processed head position can be made to change quickly in response to that. For that reason, it becomes possible to perform game processing advantageously using a filter processed head position.

Then, the position information obtained by viewpoint change processor 73 is sent to image processor 16. In this way, the viewpoint of a simulated camera in a simulated 3-dimensional space can be established in image processor 16, based on information inputted as explained above, and display processing of images viewed from that viewpoint is accomplished.

Note that the present invention is not limited to the above-described embodiments.

(1) For camera unit 42, two camera devices separated by a certain distance and placed so that their shooting directions cross each other (preferably crossing at a right angle) may be used. They should be arranged so that from their respective player images, the two-dimensional movement of the marked region is calculated, with one camera (pointed in the same direction as monitor 18) capturing up/down and transverse movement, while the other camera (pointed to cross the screen of monitor 18) is pointed such that it acquires depthwise movement, relative to monitor 18. By doing this, 3-dimensional player movement can be detected and it is possible to move the simulated camera viewpoint inward and outward, in addition to up/down and right/left.

(2) In the present embodiment, for the game images, images in a 3-dimensional space were used, but the present invention can also be applied to games played in 2-dimensional space, and in that case images can be moved up/down or right/left in the screen.

(3) In the above description an example was presented in which the present invention was applied to a gun shooting game, but it could be applied to any kind of game as long as images are acquired by an image capturing means and the game proceeds based on those images.

(4) Here player P's head was used as the object whose position was recognized, but another part may be used as the object of position recognition. Moreover, any object which player P holds in his hand, for example a toy golf club, a toy tennis racquet, or a toy gun, etc. may be used as the object of position recognition.

In summary, the present invention relates to a video game apparatus including a display for displaying images; a display control means for creating game images as seen from a simulated camera viewpoint and displaying said images on the screen of the display; and a game control part for conducting the game in response to reactions of a player responsive to the images displayed on the display. The video game apparatus of this invention comprises: an image capture means which can be arranged in such an orientation that its field of view is the play area in front of the display screen, and which periodically captures an image of the play area in the state thus arranged; a position detecting means for detecting from the captured images the position of a player's marked region; a movement detecting means for detecting two-dimensional movement of the position of the marked region thus detected; and a viewpoint changing means for moving the simulated camera viewpoint, in conjunction with the change direction and change amount of the position of the detected marked region.

The present invention takes another form. That is a method for controlling movement of a simulated camera viewpoint in a video game that is conducted by creating game images as seen from a simulated camera viewpoint, and displaying the images on the display while moving the simulated camera viewpoint in response to reactions of a player responsive to the images displayed on the display, the method comprising the steps of: while periodically capturing images of the play area by means of an image capturing means positioned in a desired position so that its orientation is such that its field of view is the play area in front of the display screen, detecting a player's marked region from these captured images; further detecting two-dimensional movement of the position of the marked region; and moving the simulated camera viewpoint in conjunction with the direction of change and amount of change of the position of the detected marked region.

According to the aforementioned features, game images, for example 3-dimensional images, from the simulated camera viewpoint are created. These images are displayed on the screen of a display and the game proceeds while the simulated camera viewpoint moves due to player response, for example change in player stance, as player responds to the images displayed on above-mentioned display. In addition, images of the play area are periodically captured by means of an image capturing means positioned in a desired position so that its orientation is such that its field of view is the play area in front of the display screen. Then, from these captured images, the player's marked region for example his head, is detected and, additionally, two-dimensional movement of the position of the above-mentioned marked region is detected. The simulated camera viewpoint is moved so that above-mentioned simulated camera viewpoint points to the position of the detected marked region that is, it is linked to (made to follow) the direction of change and amount of change of the simulated camera. According to the invention described in the above, the image capture means can be readily mounted in a desired position relative to the display, and images can be constructively presented from the player's intended viewpoint, as though the simulated camera viewpoint is made to follow the player's free movement. In this way, the scope of game play can be broadened and games can be provided which are rich in interest and realism.

In the above described invention, the player's marked region can be the player's head. With this configuration, because the movement of the player's head, and thus his eyes, corresponds to the simulated camera viewpoint, movement of the viewpoint becomes realistic. As a result, because the viewpoint of the simulated camera and the movement of the player's head (that is, his eye position) can be matched, a more realistic viewpoint movement can be achieved.

Furthermore, in the above invention, the operational contents from a controller capable of external control can be to be reflected in the progress of the game. With this configuration, by conducting the game content through operation of a control part, such as a model gun, functioning as a game controller, the game becomes one richer in content variation. With the aforementioned feature, game content is carried out through operation of a control part, such as a model gun, etc., functioning as a game controller, and games can be provided which are richer in content variation.

In addition, in the above invention, it may be possible that the image capture means includes first and second image capture means separated by a specified distance and arranged so that their directions intersect, and 3-dimensional movement of the player's marked region is detected from player images obtained by the first and second image capture means. With this configuration, because 3-dimensional movement of the player can be detected, it becomes possible to move the simulated camera viewpoint in the inward-outward direction in addition to the up/down and transverse directions, and the effect is a more realistic performance, especially in cases where the game images are 3-dimensional. With the aforementioned feature, because player's 3-dimensional movement can be detected, depthwise movement of the simulated camera viewpoint in addition to up/down and transverse movement (in other words, 3-dimensional movement) is possible.

The present invention can take another form which is a recording medium which stores a program for having a computer execute the method for controlling movement of a simulated camera viewpoint in a video game as recited in the above descriptions.

This application is based on Japanese Patent Application Serial No. 2001-220312 filed in Japan Patent Office on Jul. 19, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. In a video game apparatus including a display having a screen for displaying images, display control means for creating game images as seen from a simulated camera viewpoint and displaying said images on the screen of said display; and a game control part for conducting the game in response to reactions of a player responsive to the images displayed on said display; said video game apparatus comprising:
    image capture means which can be arranged in such an orientation that a field of view is a play area in front of the display screen, and said image capture means periodically capturing an image of the play area in a state arranged;
    a main memory having a first buffer storing the captured images by the image capture means and a second buffer storing a position of a reference region of the player;
    said image capture means including:
        an averaging processor generating an average image based on a plurality of the captured images stored in the first buffer except a last captured image;
        a first differentiator/binary converter generating a difference regarding color information between the last captured image and the averaged image;
    an area determinator checking whether an area of a region corresponding to said difference is below a threshold value or not;
    position detecting means for detecting from the captured images a position of a player's reference region in case said area is found to be greater than the threshold value and for storing the position of the detected reference region into the second buffer;
    movement detecting means for detecting two-dimensional movement of said position of the reference region detected by said position detecting means; and
    viewpoint changing means for moving the simulated camera viewpoint to a new viewpoint in accordance with a change direction and change amount of the position of the detected reference region and displaying on the screen a view from said new viewpoint.

2. A video game apparatus according to claim 1, further comprising initial play position setup means for performing initial calibration processing to normalize the player's standing position.

3. A video game apparatus according to claim 2, wherein said initial play position setup means displays a player standing position guide image on the screen and a reference position region at a predetermined position in said player standing position guide image, and a present position mark corresponding to a player's reference region, obtained from said position detecting means, is superimposed on the player standing position guide image.

4. A video game apparatus according to claim 3, wherein when said present position mark is within the reference position region, said reference position region is displayed in a color differently than the color thereof when the present position mark is outside of the reference position region.

5. The video game apparatus according to claim 1, wherein the player's reference region is the player's head.

6. The video game apparatus according to claim 1, wherein operational contents given by a controller capable of external control are reflected in the progress of the game.

7. The video game apparatus according to claim 1, wherein the image capture means comprises first and second image capture means separated by a specified distance and arranged so that their directions intersect so that 3-dimensional movement of the player's reference region is detected from player images obtained by the first and second image capture means.

8. The video game apparatus according to claim 1, wherein said image capture means is formed in such a manner that it can be mounted on a desired position with respect to the display.

9. A video game apparatus according to claim 1, further comprising filter processing means for outputting an average value of the positions of the player's reference regions stored in the second buffer.

10. The video game apparatus according to claim 9, wherein said filter processing means includes:

information updating means for updating position data, said position data being indicative of the positions of the player's reference regions in said second buffer;

a movement amount calculator for calculating each movement amount between a present position of the reference region and a last position of the reference region and for calculating an average value of said movement amounts; and buffer size determining means for determining a size of the second buffer according to the averaged value of the movement amounts.

11. The video game apparatus according to claim 1, wherein said image capture means further includes an image extractor which extracts an image of a specified radius centered on the reference region of the player from the difference of the image obtained by said first differentiator/binary converter and said area determinator checks whether an area of the reference region corresponding to said difference in said extracted image is below the threshold value.

12. A method for controlling movement of a simulated camera viewpoint in a video game that is conducted by creating game images as seen from a simulated camera viewpoint, and displaying the images on said display while moving the simulated camera viewpoint in response to reactions of a player responsive to the images displayed on the display, said method comprising the steps of:

periodically capturing images of a play area by means of an image capturing means positioned in a desired position so that an orientation is such that a field of view is a play area in front of the display screen including the player;

storing the captured images;

generating an averaged image based on averaging a plurality of the captured images stored in an image buffer except a last captured image;

generating a difference regarding color information between the last captured image and the averaged image;

checking whether an area of a region corresponding to said difference is below a threshold value or not;

detecting a player's reference region from the last captured image; detecting two-dimensional movement of a position of the reference region; and moving said simulated camera viewpoint to a new viewpoint in accordance with a direction of change and amount of change of the two-dimensional movement of the position of the detected reference region when said difference is greater than said threshold value and displaying on said screen a view from the new viewpoint.

13. The method according to claim 12, wherein the player's reference region is the player's head.

14. The method according to claim 12, wherein operational contents given by a controller capable of external control are reflected in the progress of the game.

15. The method according to claim 12, wherein the captured images are captured by first and second image capture means separated by a specified distance and arranged so that their directions intersect so that 3-dimensional movement of the player's reference region is detected from player images obtained by the first and second image capture means.

16. A recording medium storing a program for controlling movement of a simulated camera viewpoint in a video game that is conducted by creating game images as seen from a simulated camera viewpoint, and displaying the images on said display while moving the simulated camera viewpoint in response to reactions of a player responsive to the images displayed on the display, said program comprising the steps of:

periodically capturing images of a play area by means of an image capturing means positioned in a desired position so that an orientation is such that a field of view is a play area in front of the display screen including the player;

storing the captured images;

generating an averaged image based on averaging a plurality of the captured images stored in an image buffer except a last captured image;

generating a difference regarding color information between the last captured image and the averaged image;

checking whether an area of a region corresponding to said difference is below a threshold value or not;

detecting a player's reference region from the last captured image;

detecting two-dimensional movement of a position of the reference region; and moving said simulated camera viewpoint to a new viewpoint in accordance with a direction of change and amount of change of the two-dimensional movement of the position of the detected reference region when said difference is greater than said threshold value and displaying on said screen a view from the new viewpoint.

* * * * *